United States Patent
Litvin et al.

(10) Patent No.: US 9,299,001 B2
(45) Date of Patent: Mar. 29, 2016

(54) OBJECT IDENTIFICATION USING SPARSE SPECTRAL COMPONENTS

(75) Inventors: Andrew Litvin, Stoneham, MA (US); Sergey B. Simanovsky, Brookline, MA (US); Ram C. Naidu, Newton, MA (US)

(73) Assignee: ANALOGIC CORPORATION, Peabody, MA (US)

(*) Notice: Subject to any disclaimer, the term of this patent is extended or adjusted under 35 U.S.C. 154(b) by 268 days.

(21) Appl. No.: 13/882,277

(22) PCT Filed: Oct. 29, 2010

(86) PCT No.: PCT/US2010/054645
§ 371 (c)(1),
(2), (4) Date: Apr. 29, 2013

(87) PCT Pub. No.: WO2012/057779
PCT Pub. Date: May 3, 2012

(65) Prior Publication Data
US 2013/0216100 A1 Aug. 22, 2013

(51) Int. Cl.
*G06K 9/46* (2006.01)
*G01V 5/00* (2006.01)
*G06K 9/52* (2006.01)

(52) U.S. Cl.
CPC ............... *G06K 9/46* (2013.01); *G01V 5/0008* (2013.01); *G06K 9/522* (2013.01); *G06K 2209/09* (2013.01)

(58) Field of Classification Search
None
See application file for complete search history.

(56) References Cited

U.S. PATENT DOCUMENTS

| | | | | | |
|---|---|---|---|---|---|
| 5,098,640 | A | * | 3/1992 | Gozani | G01V 5/0008 376/159 |
| 5,182,764 | A | * | 1/1993 | Peschmann | G01V 5/005 250/442.11 |
| 5,367,552 | A | * | 11/1994 | Peschmann | G01V 5/005 376/159 |
| 7,761,139 | B2 | * | 7/2010 | Tearney | A61B 5/0066 600/473 |
| 8,532,360 | B2 | * | 9/2013 | Suri | A61B 8/0891 382/131 |
| 2005/0010106 | A1 | * | 1/2005 | Lang | A61B 6/469 600/425 |
| 2005/0179892 | A1 | * | 8/2005 | Gerstner | G01N 21/6428 356/318 |

(Continued)

FOREIGN PATENT DOCUMENTS

EP 1220141 A1 7/2002

OTHER PUBLICATIONS

Int. Preliminary Report on Patentability cited in PCT Application No. PCT/US2010/054645 dated Apr. 30, 2013, 8 pgs.

(Continued)

*Primary Examiner* — Tsung-Yin Tsai
(74) *Attorney, Agent, or Firm* — Cooper Legal Group, LLC (57) ABSTRACT

One or more systems and/or techniques are provided to identify and/or classify objects of interest (e.g., potential granular objects) from a radiographic examination of the object. Image data of the object is transformed using a spectral transformation, such as a Fourier transformation, to generate image data in a spectral domain. Using the image data in the spectral domain, one or more one-dimensional spectral signatures can be generated and features of the signatures can be extracted and compared to features of one or more known objects. If one or more features of the signatures correspond (e.g., within a predetermined tolerance) to the features of a known object to which the feature(s) is compared, the object of interest may be identified and/or classified based upon the correspondence.

19 Claims, 7 Drawing Sheets

(56) References Cited

U.S. PATENT DOCUMENTS

| | | | |
|---|---|---|---|
| 2008/0002910 A1* | 1/2008 | Ojima | G09G 5/00 382/277 |
| 2009/0297048 A1* | 12/2009 | Slotine | G06K 9/4671 382/224 |
| 2009/0316141 A1* | 12/2009 | Feldkhun | G01N 21/6458 356/217 |
| 2011/0188751 A1* | 8/2011 | Litvin | G06T 7/0091 382/173 |
| 2012/0099777 A1* | 4/2012 | Ying | G06T 7/0081 382/131 |
| 2012/0121168 A1* | 5/2012 | Pavlovich | G06K 9/00771 382/154 |
| 2012/0230467 A1* | 9/2012 | Katsumata | A61B 6/032 378/19 |

OTHER PUBLICATIONS

EP Communication cited in EP Application No. 10776487.0 dated Jun. 12, 2013, 2 pgs.

International Search Report cited in related application No. PCT/US10/54645 dated Aug. 5, 2011.

* cited by examiner

OBJECT IDENTIFICATION USING SPARSE SPECTRAL COMPONENTS

BACKGROUND

The present application relates to the field of x-ray and computed tomography (CT). It finds particular application with CT security scanners. It also relates to medical, security, and other applications where identifying objects of interest and in particular potential granular objects (e.g., small, substantially uniformly shaped objects) would be useful.

Security at airports and in other travel related areas is an important issue given today's sociopolitical climate, as well as other considerations. One technique used to promote travel safety is baggage inspection. Often, an imaging apparatus is utilized to facilitate baggage screening. For example, a CT device may be used to provide security personnel with two-dimensional and/or three-dimensional views of objects. After viewing images provided by the imaging apparatus, security personnel may make a decision as to whether the baggage is safe to pass through the security check-point or if further (hands-on) inspection is warranted.

Current screening techniques and systems can utilize automated object recognition in images when screening for potential threat objects inside luggage. These systems can extract information about an object(s) from an image(s), and compute properties of the object(s) based upon the extracted information. Properties of examined object(s) (e.g., density, shape, atomic characteristics, etc.) can be compared to properties of threat items, non-threat items, or both classes of items to identify the examined object(s) and/or to classify the object(s) (e.g., as a potential threat or non-threat item).

Certain types of non-threat items, such as vitamins, candy, and/or other granular objects, for example, are traditionally difficult to distinguish from threat items because such non-threat items share similar density, shape, and/or other morphological characteristics with threat items, and thus are mistakenly characterized as potential threat items. Such a mischaracterization is commonly referred to in the art as a false alarm. It will be appreciated that when an item is flagged as a potential threat item, even if it is a false alarm, additional security precautions, such as a manual search of the baggage, are taken to inhibit passage of a threat item through security. Thus, to increase throughput at a security checkpoint, for example, it is beneficial to decrease the false alarm rate.

SUMMARY

Aspects of the present application address the above matters, and others. According to one aspect, a method for identifying an object in image data generated by a radiographic examination is provided. The method comprises using a spectral signature from image data indicative of a selected subset of one or more image slices of an object to identify image data indicative of a granular object.

According to another aspect, a system for identifying an object in image data generated by a radiographic examination is provided. The system comprises a transformer component configured to transform at least a portion of image data indicative of a selected subset of one or more slices of the object so that a magnitude of respective voxels of the selected subset of one or more slices is determined, yielding image data indicative of a spectral transform for the portion of the selected one or more slices. The system also comprises a spectral signature determination component configured to generate one or more signature curves for the object by converting the image data indicative of the spectral transform to a one-dimensional representation. The system further comprises a comparison component configured to compare feature data of the one or more signature curves for the object against feature data for known objects to determine a probability that the object is associated with a particular class of objects.

According to another aspect, a method for identifying objects in image data generated by a radiographic examination is provided. The method comprises generating image data indicative of a spectral transform of at least a portion of the object and generating one or more spectral curves representative of the image data indicative of the spectral transform, where a first variable of the curve comprises a radial frequency dimension of the spectral transform and a second variable comprises an average spectral transform value for spatial frequencies along a circle with a corresponding radius. The method also comprises comparing feature data of the one or more signature curves for the object against one or more thresholds to classify the object.

Those of ordinary skill in the art will appreciate still other aspects of the present invention upon reading and understanding the appended description.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for separating non-threat objects from potential threat items based upon one or more images generated by subjecting the object to imaging using an image apparatus (e.g., a computed tomography (CT) device) are provided herein. Stated differently, techniques and/or systems for identifying and/or classifying objects as potential threat or non-threat items are provided. In this way, granular objects, for example, may be accurately identified and/or classified, resulting in a decrease in the false alarm rate of such objects, for example.

Figure 1:
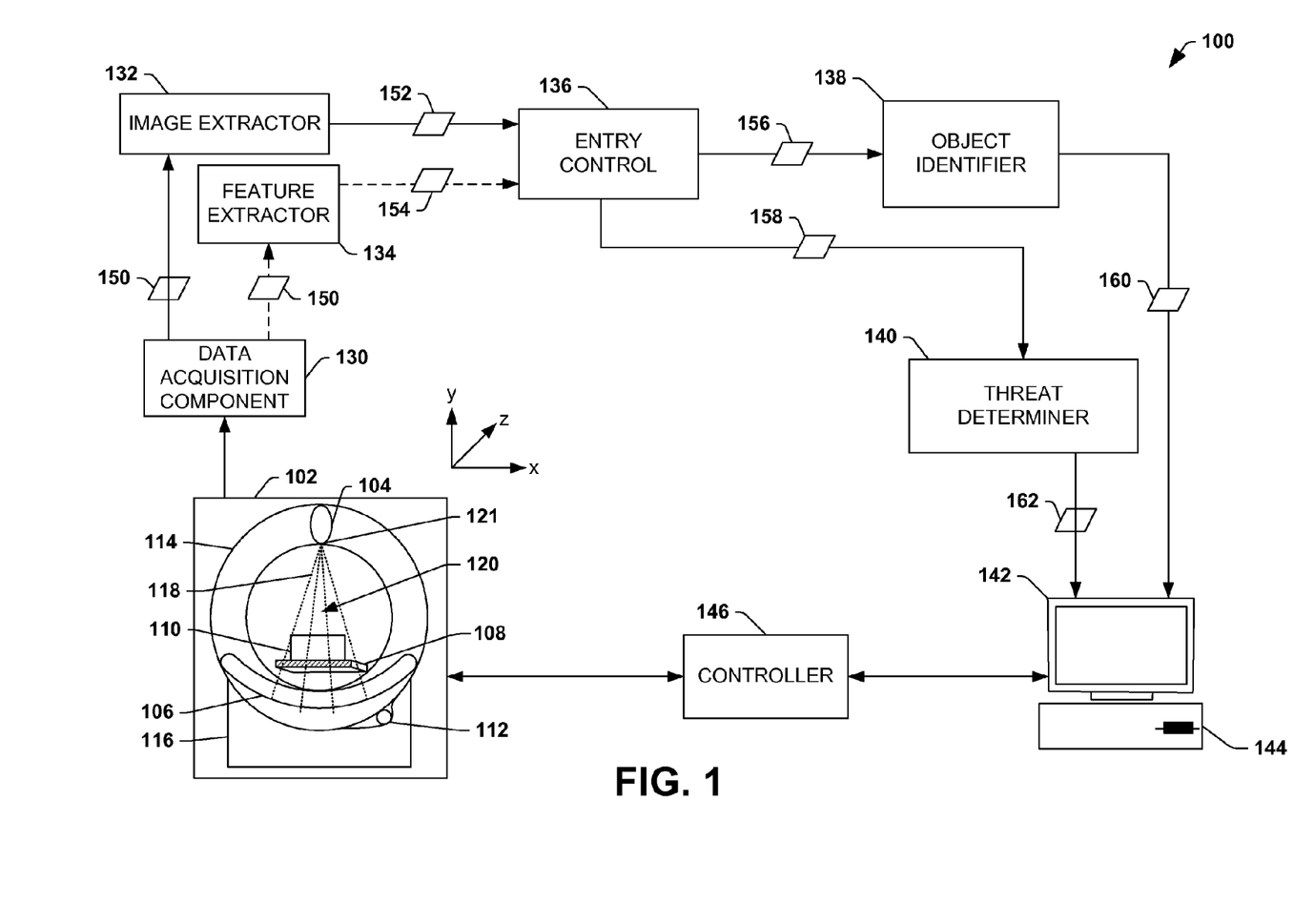
FIG. 1 is a schematic block diagram illustrating an example examination environment.

FIG. 1 is an illustration of an example environment 100 in which a system and/or method may be employed for identifying non-threat and/or potential threat objects, from a class of objects, inside a container that has been subjected to imaging using an imaging apparatus (e.g., a CT scanner). In the example environment 100 the imaging apparatus comprises an object examination apparatus 102, such as a security scanning apparatus (e.g., used to scan luggage at an airport). The examination apparatus 102 may be used to examine and/or scan one or more objects 110 (e.g., a series of suitcases at the airport). The examination apparatus 102 typically comprises a rotating gantry 114 and stationary equipment 116 (e.g., where the rotating gantry 114 rotates in an x, y plane in the illustrated example).

The rotating gantry 114 comprises a radiation source 104 (e.g., an X-ray tube or other ionizing radiation source), an array of radiation detectors 106 (e.g., X-ray detectors), and a rotator 112 (e.g., a gantry motor) for rotating the rotating gantry 114 (e.g., including the radiation source 104 and detectors 106) around the object(s) 110 being examined. In one example, the detectors 106 are mounted on a substantially diametrically opposite side of the rotating gantry 114 relative to the radiation source 104. An examination surface 108 (e.g., a conveyor belt) passes through an opening in the rotating gantry 114 and may be configured to convey the object(s) 110 from an upstream portion of the examination apparatus 102 to a downstream portion (e.g., into and/or out of the page in a z-direction in the illustrated example).

As an example, a computed tomography (CT) security scanner 102 that includes a radiation source 104, such as an X-ray tube, can generate a fan, cone, wedge, or other shaped beam of radiation 118 that traverses one or more objects 110, such as suitcases, in an examination region 120. In this example, the radiation 118 is emitted by the source 104, traverses the examination region 120 that contains the object(s) 110 to be scanned, and is detected by an X-ray detector 106 across from the X-ray source 104. Further, a rotator 112, such as a gantry motor drive attached to the scanner, can be used to rotate the X-ray source 104 and detector 106 around the object(s) 110, for example. In this way, X-ray projections from a variety of perspectives of the object can be collected, for example, creating a set of X-ray projections for the object(s). While illustrated with the x-ray source 104 and detector 106 rotating around an object, it will be appreciated that, in another example, the radiation source 104 and detector 106 may remain stationary while the object 110 is rotated.

In the example environment 100, a data acquisition component 130 is operably coupled to the examination apparatus 102 and is typically configured to collect information from the detector 106. The data acquisition component 130 may also be used to compile the collected information into projection space data 150 for an object 110. As an example, X-ray projections may be acquired at each of a plurality of angular positions with respect to the object 110. Further, as the object(s) 110 is conveyed from an upstream portion of the object scanning apparatus 102 to a downstream portion (e.g., conveying objects parallel to the rotational axis of the rotating gantry 114 (into and out of the page)), the plurality of angular position X-ray projections may be acquired at a plurality of points along the axis of rotation with respect to the object(s) 110. In one embodiment, the plurality of angular positions may comprise an X and Y axis with respect to the object(s) being examined, while the rotational axis may comprise a Z axis with respect to the object(s) being scanned.

In the example environment 100, an image extractor 132 is coupled to the data acquisition component 130, and is configured to receive the projection space data 150 from the data acquisition component 130 and generate three-dimensional image data 152 indicative of the scanned object 110 using a suitable analytical, iterative, and/or other reconstruction technique (e.g., backprojecting from projection space to image space, tomosynthesis reconstruction, etc.). The image data 152 (e.g., the intensity and/or the magnitude of respective voxels) may represent certain physical properties of the object under examination, such as density in respective spatial locations, for example.

In one embodiment, the three-dimensional image data 152 for a suitcase, for example, may ultimately be displayed on a monitor 142 of a terminal 144 (e.g., desktop or laptop computer) for human observation. In this embodiment, an operator may manipulate the image, for example, rotating and viewing the suitcase from a variety of angles, zoom levels, and positions.

It will be appreciated that, while the example environment 100 utilizes the image extractor 132 to extract three-dimensional image data 152 from the projection space data 150 generated by the data acquisition component 130, for example, for a suitcase being examined, the techniques and systems, described herein, are not limited to this embodiment. In another embodiment, for example, three-dimensional image data may be generated by an imaging apparatus that is not coupled to the system. In this example, the three-dimensional image data may be stored onto an electronic storage device (e.g., a CD-ROM, hard-drive, flash memory) and delivered to the system electronically. In yet another environment, such as where the object 110 is examined from merely one perspective, the environment may not include an image extractor, such as the one illustrated herein, because three-dimensional image data cannot be yielded from the examination (e.g., because the object was not viewed from multiple perspectives).

In the example environment 100, in one embodiment, a feature extractor 134 may receive the projection space data 150 from the data acquisition component 130 for example, in order to extract object features (e.g., density, size, the standard deviation the density, etc.) from the examined items(s) 110 (e.g., a carry-on bag containing items) and/or to generate a label image 154 based upon the extracted features (e.g., where respective voxels of the image are labeled as being representative of respective items depicted in the image). For example, where the projection space data 150 is determined to comprise two disparate items, voxels that are determined to be associated with a first item may be labeled with the numerical value "1," and voxels that are determined to be associated with a second item may be labeled with the numerical value "2." In this way, voxels are grouped according to the respective item they represent, for example.

It will be appreciated that the systems, described herein, are not limited to having a feature extractor 134 at a location in the example environment 100. For example, the feature extractor 134 may be a component of the image extractor 132, whereby three-dimensional image data 152 and a label image 154 are both produced by the image extractor 132. In another example, the feature extractor 134 may be disposed after the image extractor 132 and may extract object features from the three-dimensional image data 152. Those skilled in the art may devise alternative arrangements for supplying three-dimensional image data 152 and a label image 154 to the example system, including originating from an external, remote, decoupled, etc. system.

In the example environment 100, an entry control 136 may receive three-dimensional image data 152 and label image 154 for the one or more examined objects 110. The entry control 136 can be configured to identify an object of interest (e.g., a potential granular object) in the three-dimensional image data based on a label image and/or to convert at least a portion of the three-dimensional image data indicative of an object of interest represented in the three-dimensional image data 152 into two-dimensional space. In this way, the three-dimensional image data 152 can be filtered such that image data potentially indicative of an object of interest 156 (e.g., one or more granular objects) can be separated from image data 158 that is not indicative of an object of interest, for example.

Three dimensional image data 158 that is not indicative of an object of interest, as determined by the entry control 136, may be output to a threat determiner 140, which is configured to determine whether objects represented in the image data 158 are potential threat and/or non-threat items. For example, in one embodiment, where the image data represents a plurality of objects (such as a hairdryer, clothes, etc., in a travel baggage), the threat determiner 140 is configured to separate the image data representing the respective objects (e.g., using image separation techniques known to those skilled in the art such as segmentation and/or erosion) and to identify features, such as density, size, shape, etc. that may be compared with similar features of known objects to identify the respective objects and/or to determine whether respective objects are potential threat and/or non-threat items. In one embodiment, information 162 pertaining to the results of the identification and/or a classification of the object (e.g., as a potential threat and/or non-threat item) along with the three-dimensional image data 158 not indicative of an object of interest (e.g., indicative of a non-granular object) is transmitted to a terminal 144, where it can be displayed on a monitor 142 for human observation. In this way, in this example, real-time information can be retrieved for objects subjected to examination by an examination apparatus 102.

In one embodiment, the entry control 136 is further configured to capture, generate, or otherwise acquire a subset of one or more slices 156 of the three-dimensional image data 152 that is determined to be indicative of an object of interest (e.g., the potential granular object). It will be appreciated to those skilled in the art that the one or more slices 156 are two-dimensional representations of the object of interest, and thus they may be referred to herein as two-dimensional image slices and/or two-dimensional image data, for example. Respective slices 156 are comprised of a plurality of pixels. Moreover, it will be appreciated that where a portion of the slice(s) 156 comprises image data that is not representative of the object of interest and/or where more image data representative of the object of interest is acquired than is necessary for processing by an object identifier 138, for example, a region of interest (e.g., ROI) may be identified in the slice. Where such a region is identified, other portions of the slice may be hidden, discarded, or otherwise ignored by the object identifier 138, for example.

The subset of one or more two-dimensional image slices 156 is transmitted from the entry control 136 to an object identifier 138. As will be described in more detail below, the object identifier 138 is configured to transform the two-dimensional image data 156 indicative of the object of interest (e.g., the potential granular object) into a spectral domain, such as a Fourier domain (e.g., using a 2D or 3D Fourier transform known to those skilled in the art), and to compute a magnitude of the spectral transform. Once a magnitude is computed, the magnitude may be converted into radial functions, such as angular average and/or variability, for example. Characteristic descriptors of the radial functions may then be computed and used to compute a spectral metric, where the spectral metric is the probability that the object of interest is a known object, for example. The object identifier 138 may then use the spectral metric to classify the object of interest (e.g., the potential granular object). For example, if there is a high probability that the object of interest is a vitamin jar, for example, the object of interest may be classified as a non-threat item; otherwise the object of interest may be classified as a potential threat item.

Information 160 pertaining to the object of interest, such as whether the object is a potential threat item and/or a non-threat item, may be sent to the terminal 144 and displayed to a user on the monitor 142. Further, in one embodiment, three-dimensional image data and/or two-dimensional image slices 156 indicative of the object of interest may be transmitted to the terminal 144. In this way, a user can be provided information about the object of interest (e.g., such an identity of the object and/or the threat potential of the object) and view two-dimensional and/or three-dimensional image data representative of the object of interest, for example. Thus, real-time information can be retrieved for objects subjected to examination by an examination apparatus 102, including non-threat granular objects, which are generally difficult to identify and/or classify because their characteristics generally more closely resemble threat items relative to other objects that undergo examination.

In the example environment 100, a controller 146 is operably coupled to the terminal 144. The controller 146 receives commands from the terminal 144 and generates instructions for the object examination apparatus 102 indicative of operations to be performed. For example, a human operator may want to reexamine the object 110 and the controller 146 may issue an instruction instructing the examination surface 108 to reverse direction (e.g., bringing the object back into an examination region 120 of the object examination apparatus 102).

It will be appreciated to those skilled in the art that FIG. 1 merely illustrates an example environment for an imaging apparatus and is not intended to limit the scope of the invention. For example, in one embodiment, the example imaging apparatus may comprise additional components configured to further process image data that the threat determiner 140 and/or the object identifier 138 has flagged as a potential threat item. In this way, additional measures may be taken to identify the object before a manual search of the baggage is performed, for example. Moreover, it will be appreciated that the example environment 100 merely illustrates one example of an examination apparatus and other types of examination apparatuses known to those skilled in the art are also contemplated herein. For example, the examination apparatus 102 may be configured similar to a dual energy scanner (e.g., that comprises two or more radiation sources) and/or may be configured similar to a line scanner (e.g., where the object, the radiation source, and the detector array do not rotate during the examination).

Figure 2:
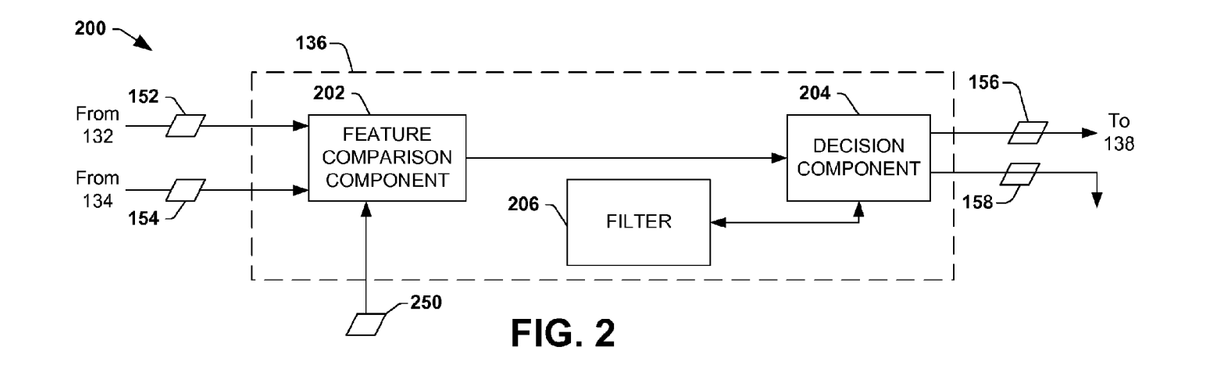
FIG. 2 is a component block diagram illustrating an entry control component of an environment wherein object identification may be implemented as provided herein.

FIG. 2 is a component block diagram illustrating one embodiment 200 of an entry control 136, which can be configured to preliminarily identify a an object of interest (e.g., a potential granular object) based on features of the object, or rather can be configured to identify image data 152 that represents (e.g., in at least a portion of the image data 152) one or more objects of interest. For example, in one embodiment, the entry control 136 is configured to preliminarily identify potential granular objects by comparing features of the object against a database of pre-classified objects. It will be appreciated that the image data 152 that is input into the entry control 136 may be two-dimensional image data and/or three-dimensional image data depending upon the type of examination performed. For example, where an examination is performed from merely one perspective (e.g., such as may occur using a line-scanner), the image data 152 that is input into the entry control 136 may be two-dimensional image data. Where the examination is performed from a plurality of perspectives (e.g., such as may occur using a CT scanner), the image data 152 that is input into the entry control 136 may be three-dimensional image data.

In one embodiment, image data 152 for an object in question can be transmitted to the entry control 136, along with label image 154. As illustrated in the example embodiment 200, the entry control 136 can comprise a feature comparison component 202, which can be configured to compare the respective features of one or more items in the label image 154 to a corresponding feature threshold 250. In this embodiment, feature values 154 can include, but not be limited to, an object's morphological properties (e.g., such as an Eigen-box fill ratio (EBFR)) for the object in question. As an example, objects having a large EBFR are typically not granular objects; while objects having a small EBFR are more likely to comprise a granular object(s). In this way, a likelihood that one or more objects represented by the image data 152 is a granular object, or rather comprises a granular object (e.g., such as a bag comprising pieces of candy and/or a medicine bottle comprising tablets of medicine) may be determined, for example. In another embodiment, the feature(s) extracted from respective voxels can include properties related to the average density of the object and/or the standard deviation of densities of portions of the object. The feature comparison component 202 may compare the standard deviation of the densities to a threshold value(s) to determine the likelihood, or probability, that one or more objects represented by the image data 152 is and/or comprises a granular object and/or other object of interest, for example.

In the example embodiment 200, the entry control 136 can comprise a decision component 204, which can be configured to identify an object of interest (e.g., a potential granular) based on results from the feature threshold comparison component 202. In one embodiment, the decision component 204 may identify an object of interest based on a desired number of positive results for respective object features, the positive results comprising an indication of a potential granular object and/or another object of interest. As an example, in this embodiment, a desired number of positive results may be one hundred percent, which means that if one or more of the object features indicates a non-granular object, the image data 158 for the object may not be sent to the object identifier 138.

The decision component 204 may also be configured to isolate at least a portion image data that is determined to be indicative of an object of interest from other portions of the image data such that a two-dimensional image comprising a region of interest (ROI) is generated. It will be appreciated that the region of interest may comprise substantially all, or less than all, of the image data indicative of the object of interest (e.g., such as merely a small square of the total image data indicative of the object of interest). Moreover, where the image data 152 that is received by the entry control 136 comprises three-dimensional image data, the decision component 204 may be configured to acquire a subset of one or more two-dimensional slices of the three-dimensional image data prior to and/or after a region of interest has been identified. Stated differently, in one example, the decision component 204 may convert the three-dimensional image data into a two-dimensional image slice(s) and then identify a region of interest in the two-dimensional image slice(s). Alternatively, the decision component may identify a region of interest in the three-dimensional image data, isolate that image data indicative of the region of interest, and then select a subset of one or more slices from the three-dimensional data indicative of a region of interest. Thus, the output 156 to the object identifier 138 generally comprises a two-dimensional image slice(s) indicative of a region of interest.

It will be appreciated that in another embodiment, the system described herein may not comprise an entry control component. Therefore some or all of the image data 158 that is not representative of a potential granular object may be further processed by an object identifier (e.g., 138 in FIG. 1) as described with respect to FIG. 3, for example. Stated differently, in one embodiment, a preliminary determination (e.g., based upon high level properties such as density, size, standard deviation, etc.) about whether image data 152 represents an object of interest (e.g., a potential granular object) is not made.

It will be appreciated that in one embodiment, where the decision component 204 identifies that a portion of the image data 152 may represent a potential granular object, the decision component 204 may be configured to transmit the image data 152 to a filter component 206 operatively coupled to the decision component that is configured to filter the image data 152. For example, where the image data 152 is three-dimensional image data, the filter component 206 may be configured to acquire a subset of one or more two-dimensional image slices from the three-dimensional image data 152 using techniques known to those skilled in the art. Moreover, where a portion of the two-dimensional image data is indicative of an object that is not of interest (e.g., a non-granular object), and/or where there is more image data representative of the object than is needed by the object identifier 138 to identify and/or classify the object of interest, the filter component 206 may filter the two-dimensional image data to identify a region of interest (ROI). For example, in one embodiment, the filter component 206 applies a non-linear filter to the one or more two-dimensional image slices to identify a region of interest based upon intensity variations represented in respective voxels of the two-dimensional image data. Two-dimensional image data that is not indicative of, or not representative of, an object of interest (e.g., image data indicative of a non-granular object) can be filtered out of the two-dimensional image data that at least partially represents one or more objects of interest. Thus, the entry control component 136 reduces the amount of computational power that is required because image data that is not indicative of an object of interest (e.g., a potential granular object) is not subjected to additional object identification techniques described below with respect to FIG. 3, for example.

Figure 3:
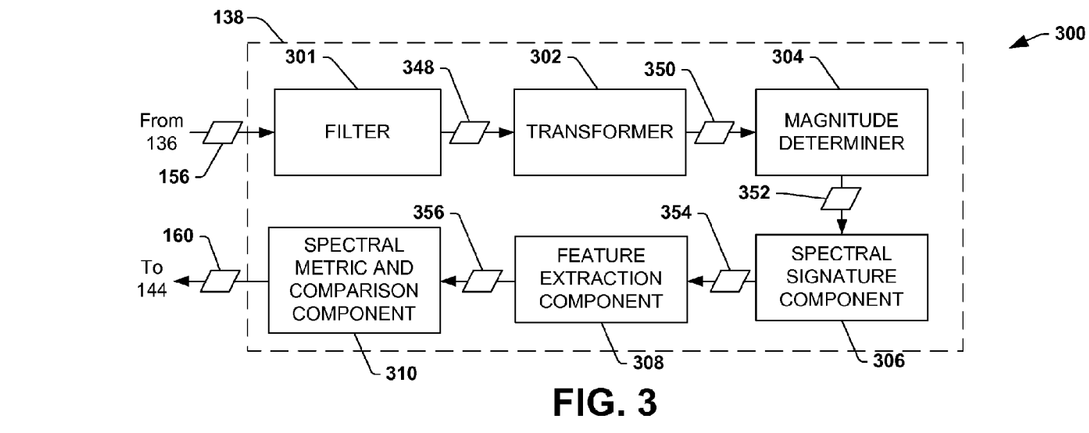
FIG. 3 is a component block diagram illustrating an object identifier of an environment wherein sub-object identification may be implemented as provided herein.

FIG. 3 is a component block diagram of one example embodiment 300 of an object identifier 138, which can be configured to identify and/or classify an object of interest (e.g., a potential granular object) from one or more two-dimensional image slices 156 representative of a region of interest. For example, in one embodiment, the object identifier 138 is configured to classify a potential granular object as a potential threat and/or non-threat item based upon the received subset of one or more two-dimensional image slice(s) 156.

In the illustrated example embodiment 300, the object identifier 138 comprises a filter component 301 that is configured to filter the two-dimensional image slice(s) 156 indicative of a region of interest such that characteristics of the voxels are enhanced or otherwise modified to improve identification. In one embodiment, the filter component 301 is configured to apply a non-linear filter to the two-dimensional image slice(s) 156 to enhance a particular density range of the voxels in the two-dimensional image slice(s) 156. For example, the two-dimensional image slice(s) 156 may be filtered based upon intensity information associated with respective voxels in the image slice(s) 156 to enhance a particular density range, for example. Thus, a two-dimensional, filtered image slice(s) 348 indicative of a region of interest is output from the filter component 301.

It will be appreciated that the filter component 301 is merely an optional component configured to enhance or promote features of the two-dimensional image slice(s) 156. Thus, in at least one embodiment, the object identifier 138 does not comprise a filter component 301 as described herein. In such an embodiment, a transformer 302 may receive an unfiltered two-dimensional image slice(s), for example.

The example embodiment 300 of the object identifier 138 also comprises a transformer 302 configured to apply a spectral transform, such as a Fourier transform, to the one or more filtered, two-dimensional image slices 348, causing the two-dimensional image data to be transformed into a spectral domain of the transform (e.g. to a Fourier domain where the spectral transform is a Fourier transform). It will be appreciated to those skilled in that art that the particular spectral transform that is applied may be a function of the number of slices yielded from the image data 152, for example. In one example, where merely one slice is yielded, a 2D Fourier transform may be applied (e.g., because a third dimension is unavailable). On the other hand, where multiple slices are yielded from the three-dimensional image data 152, a 2D and/or a 3D Fourier transform may be applied (e.g., because, as a result of acquiring multiple slices from three-dimensional image data 152, a third dimension can be determined), for example.

It will be appreciated to those skilled in the art that when an image of an object is transformed into the spectral domain, certain common characteristics can be identified. For example, where the image is transformed into the Fourier domain, a position variation for respective elements (e.g., for each pill in a pill bottle) in the image translates into a phase variation of a signature in the Fourier domain. Additionally, for respective elements, an orientation variation within the image translates into an orientation variation of the signature in the Fourier domain. Further, when multiple elements with random positions and/or orientations are superimposed in the image, the signatures of individual elements add up in random phases and orientations, producing a Fourier transform that is highly uniform in angle or radially symmetric, for example. Thus, it will be appreciated by those skilled in the art that properties describing a symmetry of the spectral transform can be used to distinguish certain kinds of objects composed of multiple similar elements (e.g. grainy objects) from other objects. For example, a Fourier transform indicative of granular objects is generally substantially symmetrical, while a Fourier transform indicative of a non-granular object is generally not symmetrical.

The results of the transformation 350 are output from the transformer 302 and transmitted to a magnitude determiner 304. Generally, these results 350 comprise a square image where each voxel of the square image is indicative of a complex value. The horizontal and vertical dimensions of the square image may correspond to spatial frequencies in a horizontal direction and a vertical direction, respectively, for example.

The example embodiment 300 also comprises a magnitude determiner 304 configured to compute a magnitude of the spectral transform at respective voxels in the results 350 (e.g., the square image) based upon their respective complex value. It will be appreciated that where the spectral transform is a Fourier transform, such a computation yields image data 352 indicative of a magnitude of the Fourier Transform. Generally, where the image data 352 indicative of the magnitude of the Fourier Transform is representative of a granular object, the image data 352 appears to illustrate a substantially radially symmetric object. It will be appreciated that in another embodiment, such as where an object of interest in a non-granular object, for example, the image data 352 indicative of the magnitude of the Fourier Transform may appear to illustrate an object having a defined shape that is not radially symmetric, thus allowing granular objects to be discriminated from other objects, for example.

The example embodiment 300 further comprises a spectral signature determination component 306 that is configured to receive the image data 352 from the magnitude determiner 304 (e.g., image data indicative of a magnitude of the Fourier Transform) and to generate a signature curve 354 (e.g., a one-dimensional representation of the two-dimensional image data 352). For example, where the image data 352 is in the Fourier domain, the spectral signature determination component 306 may be configured to convert the magnitude of the Fourier Transform into radial functions. That is, the spectral signature determination component 306 may be configured to make one or more statistical measurements (e.g. an average or standard deviation) of the Fourier transform along circles, for example, in the Fourier domain to reduce the two-dimensional image data 352 indicative of a magnitude of the Fourier Transform into a one-dimension function 354, such as a radial function, for example, which is output from the spectral signature determination component 306. In one example, the horizontal axis (e.g., a first variable) of the one-dimensional function 354 is indicative of a radial frequency (e.g., which corresponds to a radius of a circle, for example, in the 2D image data 352), and the vertical axis is indicative of an average magnitude value, or angular average, for the two-dimensional frequency values located along the circle with the corresponding radius, for example, in the image data 352. It will be appreciated by those skilled in the art that while reference is made to generating a signature curve 354 from the image data 352, a plurality of spectral curves (e.g., respectively indicative of a different statistical measurement) can be generated by the spectral signature determination component 306. For example, in one embodiment, a first spectral signature curve can be generated indicative of the average of two-dimensional image data 352 and a second spectral signature curve can be generated indicative of the standard deviation of the two-dimensional image data 352. In this way (e.g., by generating multiple curves) additional data, over that which can be acquired from merely a single spectral signature curve, can be generated and used to identify and/or classify an object of interest.

In the example embodiment 300, the signature curve(s) 354 is transmitted to a feature extraction component 308 configured to extract feature data 356 from the one-dimensional function(s) and/or to compute characteristic descriptors of the function(s) 354 based upon the extracted features. For example, the feature extraction component 308 may be configured to extract and/or compute one or more values of a spectral signature at a plurality of desired, or predetermined, radial frequencies, a ratio between values at a plurality of desired, or predetermined, radial frequencies, one or more statistical function values in a desired, or predetermined, frequency band, and a similarity of computed radial functions related to radial functions associated with one or more objects in a training data set (e.g., one or more known granular objects). It will be appreciated that the above list of items that can be extracted and/or computed based upon the one-dimensional function(s) 354 is merely an example list and it not intended to limit the scope of the characteristic descriptors that can be identified based upon the one-dimensional function 354. Other items that can be extracted and/or computed from the one-dimensional function(s) 354 are also contemplated.

As illustrated, the extracted feature data 356 is transmitted from the feature extraction component 308 to a spectral metric and comparison component 310 configured to compute a spectral metric, or object score, of the object of interest (e.g., the potential granular object) and identify and/or classify the object of interest. For example, in one embodiment, the spectral metric and comparison component 310 is configured to compute a probability (e.g., spectral metric or object score) that the object under examination (e.g., 110 in FIG. 1) comprises a granular object and/or comprises a specific granular object class (e.g., medicine, food, etc.) based upon the extracted feature data 352. For example, if the object score is over 85%, the object may be classified as a granular object and if the object score is 85% or below, the object may be classified as a non-granular object. Moreover, in one embodiment, the spectral metric and classification component 310 is to classify the granular object (e.g., as a potential threat item and/or as a non-threat item) based upon a comparison of the extracted feature data 356 with features of known objects. For example, if the extracted features are substantially similar to the features of a known object (e.g., within a predetermined tolerance), an object of interest may be identified (e.g., as the known object) and/or classified based upon the known object (e.g., if the known object is a threat item, the object of interest may be labeled as a threat item; if the known object is a non-threat item, the object of interest may be labeled as a non-threat time).

The results of the identification and/or classification 160 are output to a terminal (e.g., 144 in FIG. 1), where they may be reviewed by a user, for example. It will be appreciated that the image data 152 at least partially indicative of the object of interest may also be transmitted to the terminal. In this way, an inspector can view both the identification and/or classification and the image data 152 of the object of interest.

Figure 4:
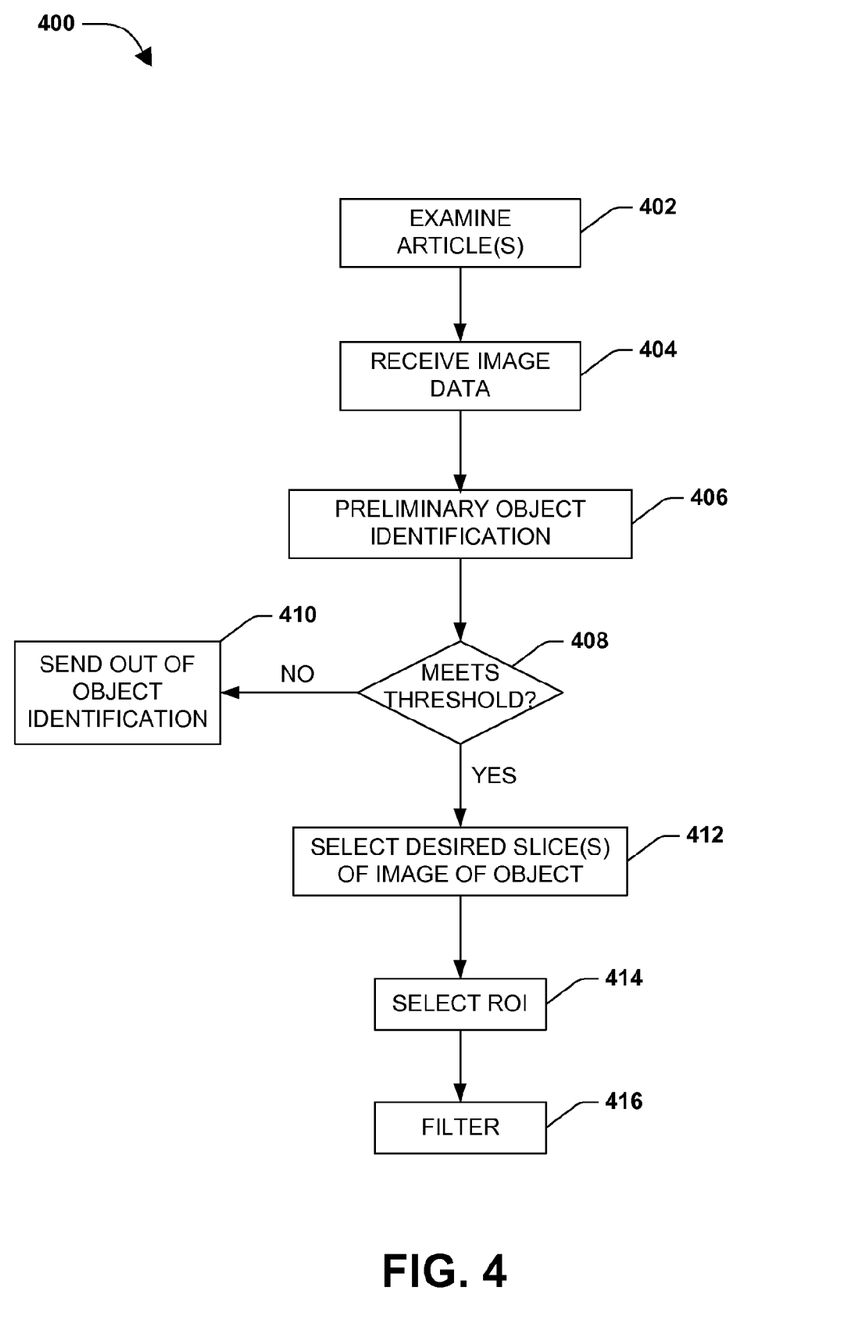
FIG. 4 is a flow chart diagram of an example method for selecting a region of interest in one or more two-dimensional slices of an object.

FIG. 4 illustrates an example method 400 for generating a two-dimensional image data of a region of interest within an object under examination. At 402, an article(s) is examined. Stated differently, radiation is emitted from a radiation source that traverses the article(s), or object(s), and is detected by a detector array of an examination apparatus. In one embodiment, such as where a CT apparatus is used to examine the article(s), the object may be examined from multiple perspectives as the radiation source and/or the detector array rotate about the article(s) under examination. In another embodiment, such as where a line scanner is used to examine the article(s), the object may be examined from merely a single perspective, for example.

At 404 image data is received from the examination. Stated differently, the radiation photons that are detected by the detector array are converted into signals (e.g., generally in the analog domain), which may be converted by an A/D converter into the digital domain to yield image data. The image data is indicative of the article under examination. It will be appreciated to those skilled in the art that the received image data may be two-dimensional image data and/or three-dimensional image data depending, upon the number of perspective from which the article(s) was examined for example. In one example, where the article(s) was examined from multiple perspectives (e.g., where the article(s) was examined in at least 180 degrees), such as in a CT examination, three-dimensional image data representative of the article(s) under examination may be acquired. Where the article(s) was examined from merely a few perspectives (e.g., where the article(s) was not examined in at least 180 degrees), such as would occur if the article(s) was examined by a line scanner, for example, merely two-dimensional image data representative of the article(s) under examination may be acquired, for example.

At 406, an object of interest, such as a potential granular object, is preliminarily identified (e.g., by an entry control component 136 in FIG. 1). Stated differently, from the two-dimensional and/or three-dimensional image data, one or more high level properties of the article(s), such as density, size, standard deviation of density, etc. are determined and, in one embodiment, are compared to similar high level properties of known articles, for example, to determine whether a portion of the examined article(s) potentially comprises an object of interest. In another embodiment, an examined article(s) is determined to comprise a potential object of interest if a predetermined number of high level properties of the examined article(s) are within a specified range(s) (e.g., as computed during a manual and/or automatic training period), where the range(s) comprises values that are typically indicative of an object of interest. For example, where objects that are of interest are potential granular objects, the range(s) may comprise values that are typically indicative of potential granular objects.

At 408 it is determined whether the high level property(ies) of the article(s) meet a predetermined threshold (e.g., if the property(ies) fall with the specified range and/or correspond with (e.g., are similar to) the high level properties of known object). If the high level property(ies) do not meet the predetermined threshold, the two-dimensional and/or three-dimensional image data is sent out of object identification at 410 because the probability that the article(s) represented by the image data comprises an object of interest (e.g., a potential granular object) is low. In one embodiment, two-dimensional and/or three-dimensional image data that is sent out of the object identification at 410 is sent to a threat determiner (e.g., 140 in FIG. 1) configured to determine whether the article(s) represented in the two-dimensional and/or three-dimensional image data is a potential threat item, for example.

If it is determined that the high level property(ies) of the article(s) meet a predetermined threshold (e.g., if it is determined that the probability of the article(s) comprising a potential granular object is higher than some threshold), a subset of one or more image slices (e.g., two-dimensional image data) is selected from the image data at 412. It will be appreciated to those skilled in that art that in one embodiment, such as where the image data received at 404 was two-dimensional image data, this act may not occur because merely one slice exists in two-dimensional image data. That is, the image cannot be sliced into two-dimensional image slices if the image data is already in two-dimensional space. Thus, the act of selecting a subset of one or more slices may occur, for example, where the image data received at 404 was three-dimensional image data, which comprises a plurality of two-dimensional slices. Where merely a single two-dimensional slice is present, the selected subset of one or more slices merely comprises the single two-dimensional slice.

The subset of slices that are selected may be based upon predetermined rules that specify one or more techniques for identifying slices to be selected. For example, in one embodiment, the three-dimensional image data is divided into an equal number of segments, and one or more slices is selected from the respective segments. It will be appreciated that other techniques for identifying slices to select are known to those of skill in the art and are also contemplated herein. For example, in another embodiment, slices are selected such that the standard deviation of values of voxels in the image slice is within a predefined limit(s). It yet another embodiment, the slices are selected such that that locations of respective slices, as determined from the center of the article(s) under examination, is within a predefined limit(s).

At 414, a region of interest (ROI) within the selected slice(s) is identified, or selected. Generally, the region of interest comprises a portion of the selected slice(s) that represents the object of interest (e.g., the potential granular object), or more particularly that comprises a subset of voxels representing the object. It will be appreciated that techniques for selecting a subset of voxels representing the object of interest are known to those skilled in the art, and may be applied herein. For example, in one embodiment, voxels are clustered, or grouped, according to their respective intensities, and voxels within an intensity range of interest are separated, isolated, or other distinguished from voxels that are not within the intensity range. In this way, voxels representing an object of interest may be identified to yield a region of interest. It will be appreciated that other properties of the article(s) that can be determined from slice(s), besides intensity, may be used in conjunction with and/or instead of intensity to identify a region of interest in the slice.

It will be appreciated to those skilled in the art that while the act of selecting slices 412 appears to come before the selection of a region of interest at 414, in another embodiment, the acts are reversed. That is, a region of interest is selected in the three-dimensional image, and slices are selected from the three-dimensional image data representing a region of interest in the object under examination. Thus, the region of interest may be selected before a subset of one or more slices is selected or it may be selected after such a subset of slices is selected.

It will be appreciated that in some embodiments, a region of interest may not be identified, as identifying a region of interest is an optional act that may reduce the computation power that is used to perform the acts of identifying and/or classifying an object of interest (e.g., as described with respect to FIG. 5), for example. Thus, in one embodiment, the acts described below may be performed on one or more slices (in their entirety), for example.

In one embodiment, after a subset of one or more slices is selected and a region of interest is selected, or identified, a filter is applied to the image data at 416, causing at least one property of the image data to be promoted (e.g., enhanced). For example, in one embodiment, a non-linear filter is applied to the two-dimensional slice(s) indicative of a region of interest to enhance an intensity spectrum represented by the voxels of the slice(s). In another embodiment, yet another property may be enhanced by the non-linear filter. In this way, voxels that are indicative of property ranges that are of interest may be highlighted or otherwise made to stand out from other voxels in the slice(s), for example.

Figure 5:
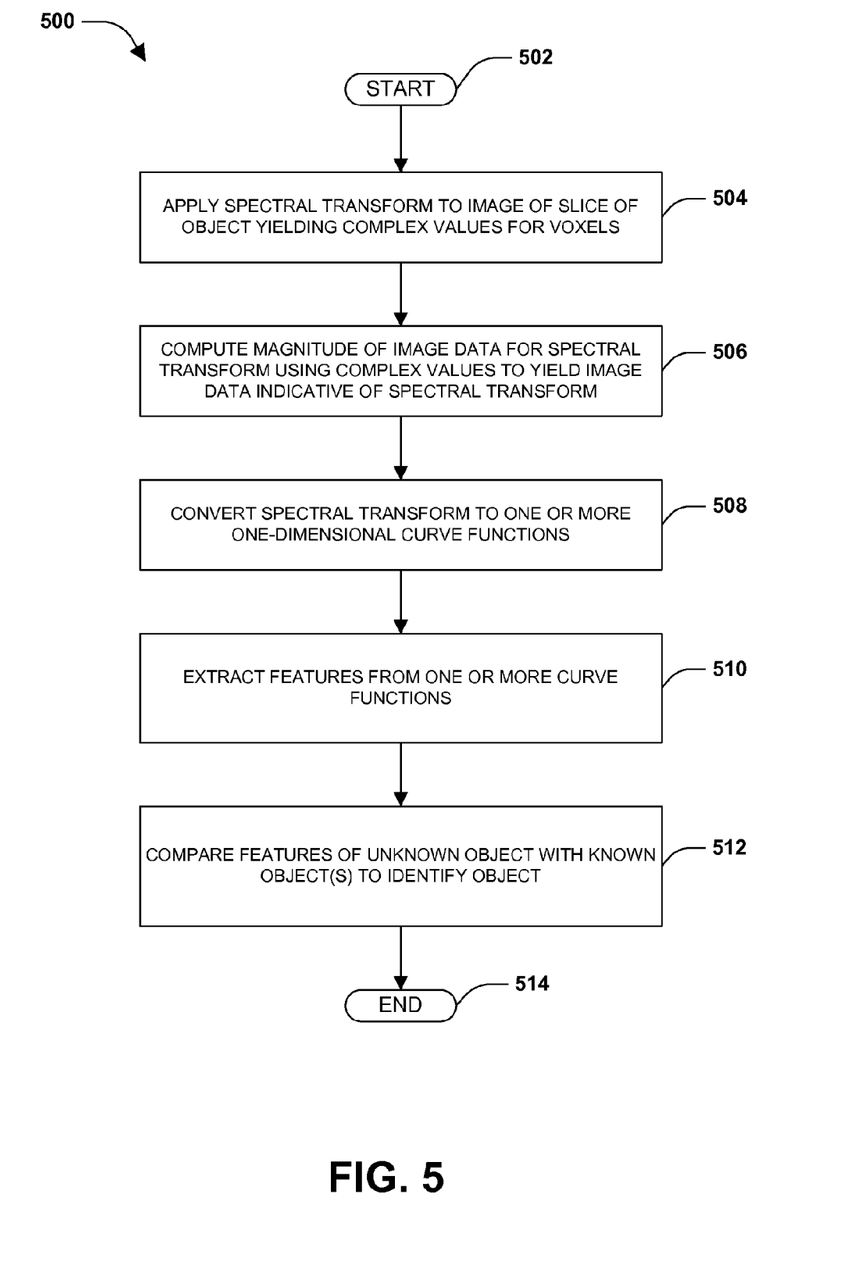
FIG. 5 is a flow diagram of an example method for identifying an object in image data generated by a radiographic examination.

FIG. 5 illustrates an example method 500 for identifying an object in image data generated by a radiographic examination. The method begins at 502, and a spectral transform is applied to one or more two-dimensional image slices, or more particularly to a portion of an image slice that is identified as a region of interest (ROI), at 504. In this way, two-dimensional image data indicative of the spectral transform may be generated, where respective voxels of the image data are respectively indicative of a complex value.

In one embodiment, the spectral transform that is applied to the subset of one or more slices is a Fourier transform, and a square image that represents respective pixels and/or voxels may be generated. It will be appreciated that such an image generally comprises horizontal and vertical dimensions representing frequencies. For example, the horizontal dimension may be indicative of spatial frequencies in the horizontal direction and vertical dimension may be indicative of spatial frequencies in the vertical direction.

It will be appreciated that the specific Fourier Transform that is used to transform the two-dimensional image data (e.g., two-dimensional image slice(s)) into the Fourier domain may be a function of the number of slices selected (e.g., at 412 in FIG. 4). For example, where merely one slice is selected, a two-dimensional (2D) Fourier transform may be used to convert the image data into the Fourier domain, and where two or more slices are selected a two-dimensional and/or a three-dimensional (3D) Fourier transform may be used to convert the image data into the Fourier domain because a third dimension of the object may be determined based upon the multiple slices, where the third dimension is represented as the spacing between slices. Thus, it may be said that where merely one slice is selected, a 2D Fourier transform may be applied to the two-dimensional image slice and where a plurality of slices are sliced either a 2D or a 3D Fourier transform may be applied to the two-dimensional image slices.

At 506 a magnitude of the two-dimensional image data indicative of the spectral transform is computed using the complex values of respective voxels of the image data indicative of the spectral transform. Stated differently, the magnitude of the spectral transform is computed at respective voxels in the image data indicative of the spectral transform based upon the complex number associated with respective voxels. For example, where the spectral transform is a Fourier transform, a magnitude of the image data in the Fourier domain may be computed using the complex values of respective voxels of the image data in the Fourier domain. For some objects of interest (e.g. granular objects), such a computation results in image data indicative of a substantially radially symmetrical magnitude (e.g., the image would appear to represent a radially symmetric object). For other objects, such a computation results in image data not indicative of a substantially radially symmetrical magnitude.

At 508, the magnitude image data that was yielded at 506 is converted into one or more spectral signatures, also referred to herein as one-dimensional curve functions or signature curves. For example, where image data indicative of a spectral transform is yielded at 506 from the computation, the image data may be converted into a one-dimensional representation of the Fourier transform. In such an embodiment, a first variable of the one-dimensional signature may comprise, or be indicative of, a radial frequency dimension and a second variable of the one-dimensional signature may comprise, or be indicative of, an angular average, or another angular statistical measure, for respective voxels of the image data indicative of the spectral transform.

It will be appreciated that the magnitude image data is converted into spectral signatures based upon the statistical measurements of the magnitude image data, and that the statistical measurements that are taken may depend upon the type of object that is of interest. For example, where granular objects (e.g., which generally are represented by a substantially radially symmetric image in the magnitude image data) are measured, a standard deviation may be measured along circles of the magnitude image data because the standard deviation measurements are indicative of symmetry (e.g., standard deviation measurements measure symmetry). Thus, the measurements that are taken (and the spectral signatures that are yielded) may vary according to the type of object that is of interest and the unique features of the type of object when represented in the spectral transform image(s). For example, a relatively unique feature of a granular object is its symmetry in the magnitude image data, and thus measuring the symmetry may assist in identifying/classifying the object.

At 510, features of the spectral signature are extracted from the one-dimensional representation(s). For example, magnitude values at specified radial frequencies and/or one or more statistical function values (e.g., energies) for magnitudes in a specified frequency band may be extracted from the one-dimensional representation(s). Moreover, other features may be computed based upon the extracted features. For example, a ratio between magnitude values of specified radial frequencies may be computed. Further, radial functions computed from the extracted features may be compared to radial functions of one or more known object (e.g., from a training set) to compute a similarity between the extracted features and features of known objects, for example. It will be appreciated that the aforementioned features that can be extracted and/or computed are merely example features and are not intended to limit the scope of possible features which can be extracted and/or computed. Those of skill in the art will appreciate that other possible features, or characteristics, may also and/or instead be extracted from the one-dimensional representation. Generally, the features that are extracted depend upon the type of objects that are of interest. For example, where granular objects are of interest, the features that are extracted may be features that are more relevant to distinguishing a potentially granular object from non-granular objects.

At 512, features of the object of interest (e.g., the potential granular object) are compared to features of one or more known objects to identify and/or classify the object of interest. For example, in one embodiment, based upon the comparison, a probability, also referred to herein as an object score, of the likelihood that the object of interest is associated with (e.g., fits within) a particular class, or type, of object is calculated. If the probability exceeds a predetermined threshold, the object is identified as being associated with, or belonging to, that particular class of object. Moreover, based upon the class of object it is associated with, for example, the object of interest may be classified as a potential threat item and/or a non-threat item. It will be appreciated that in another embodiment, based upon the probability score, the object may be identified as a particular object (e.g., as not just as belong to a class of objects). For example, the object of interest may be classified as a particular candy if the object score, when one or more features of the object of interest are compared with one or more similar features of the particular candy, exceeds a predetermined threshold. In this way (e.g., by comparing the object of interest with known objects), the object can be identified and/or classified, for example.

At 514 the example method 500 ends.

Figure 6:
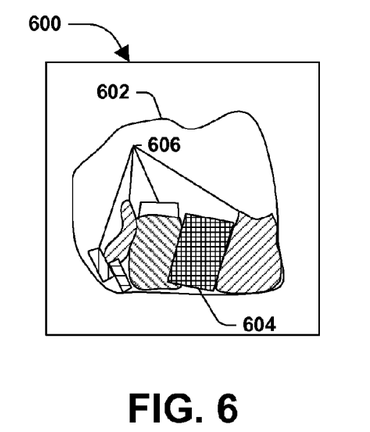
FIG. 6 is a graphical representation of image data, which may be yielded from an examination of an object.

FIG. 6 illustrates example image data 600, which may be produced during a radiographic examination of an object 602, such as a suitcase, at a security checkpoint, for example. It will be appreciated that while the image data 600 is represented in two-dimensions, the image data 600 may be three-dimensional dimensional (e.g., with the third dimension going into and out of the page). For example, CT scanners and/or other imaging apparatuses that are configured to examine the object from a plurality of perspectives may be configured to generate three-dimensional image data indicative of the object. Other imaging apparatuses, such as line scanners, for example, which generally examine the object from merely a few perspectives (e.g., generally one perspective) may be configured to generate two-dimensional image data indicative of the object.

As illustrated, the image data 600 representing the object 602 comprises a plurality of items 606, such as clothing, beauty products, souvenirs, etc. In one embodiment, the image data 600 representing the object 602 is reviewed (e.g., by an entry control component 136 in FIG. 1) to preliminarily determine whether any portion of the image data 600 potentially represents one or more items of interest. For example, here a portion of the image data 604 that is indicative of a potential granular object 604 (e.g., a portion of the image data 604 representing a medicine container comprised of a plurality of granular medicine tablets) may be identified as being of interest.

In one embodiment, if a portion of the image data 600 (e.g., 600 in FIG. 6) is determined to be representative of an object that is of interest, the image data 600 may be further processed to isolate image data 604 representing an object of interest and/or to identify/classify the object of interest based upon the image data 604 representative of the object of interest 604.

Figure 7:
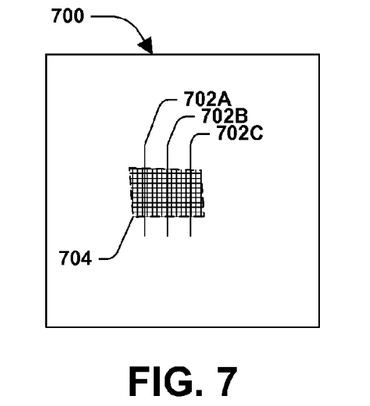
FIG. 7 is a graphical representation of a subset of slices which may be extracted from three-dimensional image data.

FIG. 7 illustrates a subset of one or more slices 702A, 702B, 702C which may be selected from three-dimensional image data 700 (e.g., 600 in FIG. 6) representative of an object 704 (e.g., 602 in FIG. 6) under examination. It will be appreciated that the three-dimensional image data 700 is turned 90 degrees relative to the orientation of the image data 600 depicted in FIG. 6. Stated differently, the dimension that was going into and out of the page in FIG. 6 is going right to left in the image 700 depicted in FIG. 7. It will also be appreciated that a least of portion of the image data comprised in the selected subset of one or more slices 702A, 702B, 702C generally represents the object of interest (e.g., 604 in FIG. 6). Moreover, at least one slice may appear substantially similar to the image data 600 depicted in FIG. 6 because FIG. 6 merely illustrates two-dimensional image data 604. Stated differently, the image data 600 in FIG. 6 may be said to represent a two-dimensional slice of the three-dimensional image data.

Moreover, where the image data that is received from the examination is two-dimensional image data, the image data may be said to comprise a slice, and thus, a subset of one or more slices may not be selected from the image data. Stated differently, the image data 600 in FIG. 6 is already a slice (which depicts the object under examination from a top-down view, for example), and thus the image data 600 is the selected subset of one or more slices.

Figure 8:
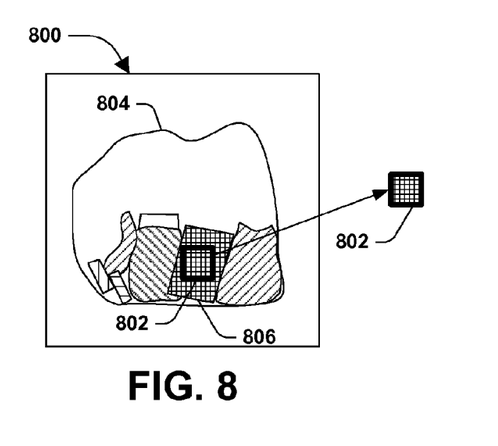
FIG. 8 is a graphical representation wherein a region of interest is selected from two-dimensional image data.

FIG. 8 illustrates a region of interest (ROI) 802 being identified from the selected one or more slices 800 (e.g., 702A, 702B, 702C) of image data representative of an object 804 under examination. It will be appreciated that techniques for identifying a region of interest are described above, but generally the region of interest comprises image data indicative of an object of interest 806 (e.g., 604 in FIG. 6). Moreover, it will be appreciated that while the region of interest 802 is illustrated herein to comprise merely a portion of the image data indicative of the object of interest 806, the region of interest may, in one example, comprise substantially all of the image data indicative of the object of interest (e.g., the potential granular object). Image data that is not comprised within the region of interest 802 may be discarded, hidden, or otherwise ignored (e.g., because additional computations do not need to be performed on the discarded image data to identify and/or classify the object of interest 604 in FIG. 6).

Figure 9:
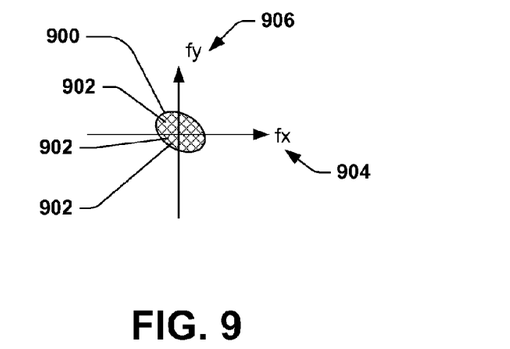
FIG. 9 is a graphical representation of two-dimensional image data in a spectral domain, such as in a Fourier domain.

Once a region of interest 802 is identified, a spectral transform is applied to the region 802 (e.g., transforming the image data into image data in a spectral domain, such as a Fourier domain). FIG. 9 illustrates example two-dimensional image data 900 that may be generated when a spectral transform, such as a Fourier transform, is applied to the image data representing a region of interest. In one embodiment, such as where a Fourier Transform is applied for example, the resulting image data 900 is a square image where respective voxels 902 of the image are indicative of a complex value. Moreover, in such an image 900, a horizontal axis 904 (fx) may be indicative of a spatial frequency in the horizontal direction, and a vertical axis 906 (fy) may be indicative of a spatial frequency in the vertical direction, for example.

Figure 10:
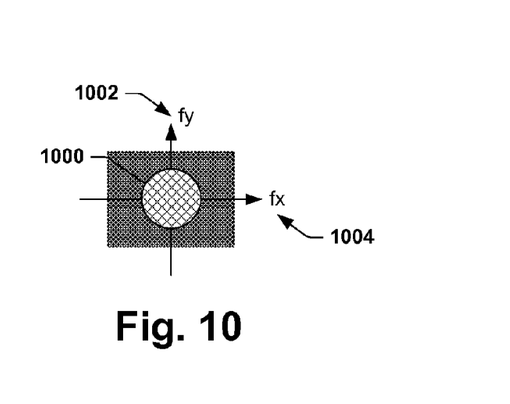
FIG. 10 is graphical representation of two-dimensional image data indicative of a magnitude of image data in a Fourier domain.

From the image data in the spectral domain, a magnitude of respective voxels in the two-dimensional image data 900 in the spectral domain is computed using the complex values of respective voxels. As illustrated in FIG. 10, the result of the magnitude computation is an image 1000 that appears to be substantially radially symmetric and is indicative of an average spectral transform of aspects within the item (e.g., pills within a medical container). It will be appreciated that where the spectral transform is a Fourier transform, a horizontal axis 1004 (fx) may be indicative of a spatial frequency in the horizontal direction and a vertical axis 1002 (fy) may be indicative of a spatial frequency in the vertical direction, for example. It will be appreciated that in other embodiments, such as where a non-granular object is of interest, the image 1000 may not appear to be substantially radially symmetric. That is, the symmetry of the image is merely a function of the object that the image is representing and may vary depending upon the type of object being examined.

Figure 11:
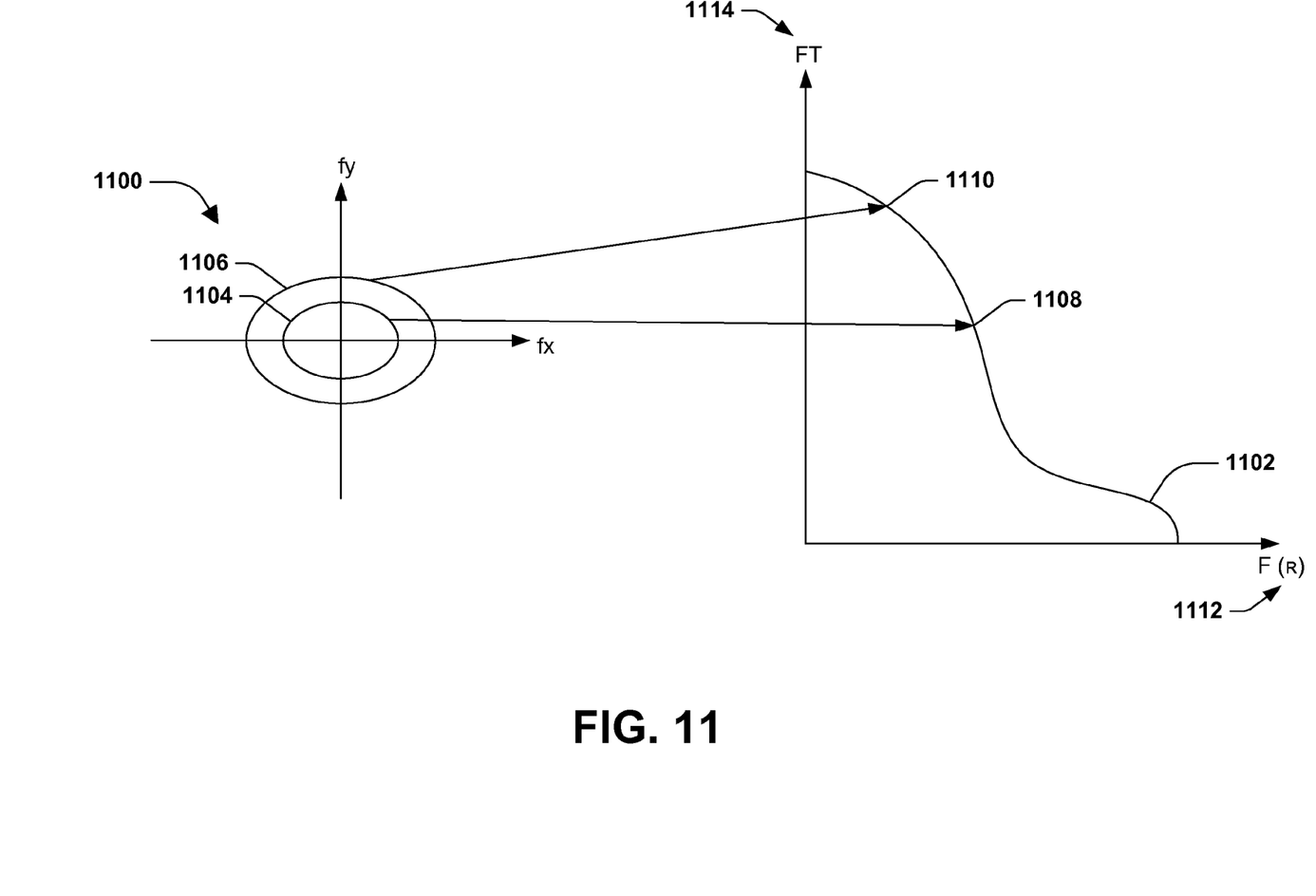
FIG. 11 illustrates a conversion of two-dimensional image data indicative of a magnitude of image data in a Fourier domain into a one-dimensional spectral signature.

As illustrated in FIG. 11, one or more one-dimensional functions 1102, or spectral signatures, can be generated using the two-dimensional image data 1100 indicative of the magnitude computation (e.g., 1000 in FIG. 10). In this way, a spectral signature can be yielded which can be used to identify features of the object of interest (e.g., a potential granular object) that can be used to identify the object and/or to classify the object, for example.

In one example, such as where the spectral transformation is a Fourier transformation, for example, the one-dimensional function(s) 1102 can be computed by averaging the Fourier Transform along one or more circles 1104, 1106 (e.g., over a 360 degree average). The average of respective circles 1104, 1106 is represented as a point in the one-dimensional function 1102. For example, an average of the Fourier Transform along a first circle 1104 is represented by a first point 1108 along the function 1102 and an average of the Fourier Transform along a second circle 1106 is represented by a second point 1110 along the function 1102. It will be appreciated that the dimensions of the function may depend upon the spectral transform that is performed. For example, where the spectral transform is a Fourier Transform, a first axis 1112 may represent a radial frequency dimension, or variability dimension, and a second axis 1114 may represent an average magnitude value for voxels along the respective circle 1104, 1106 (e.g., an angular average), for example.

Figure 12:
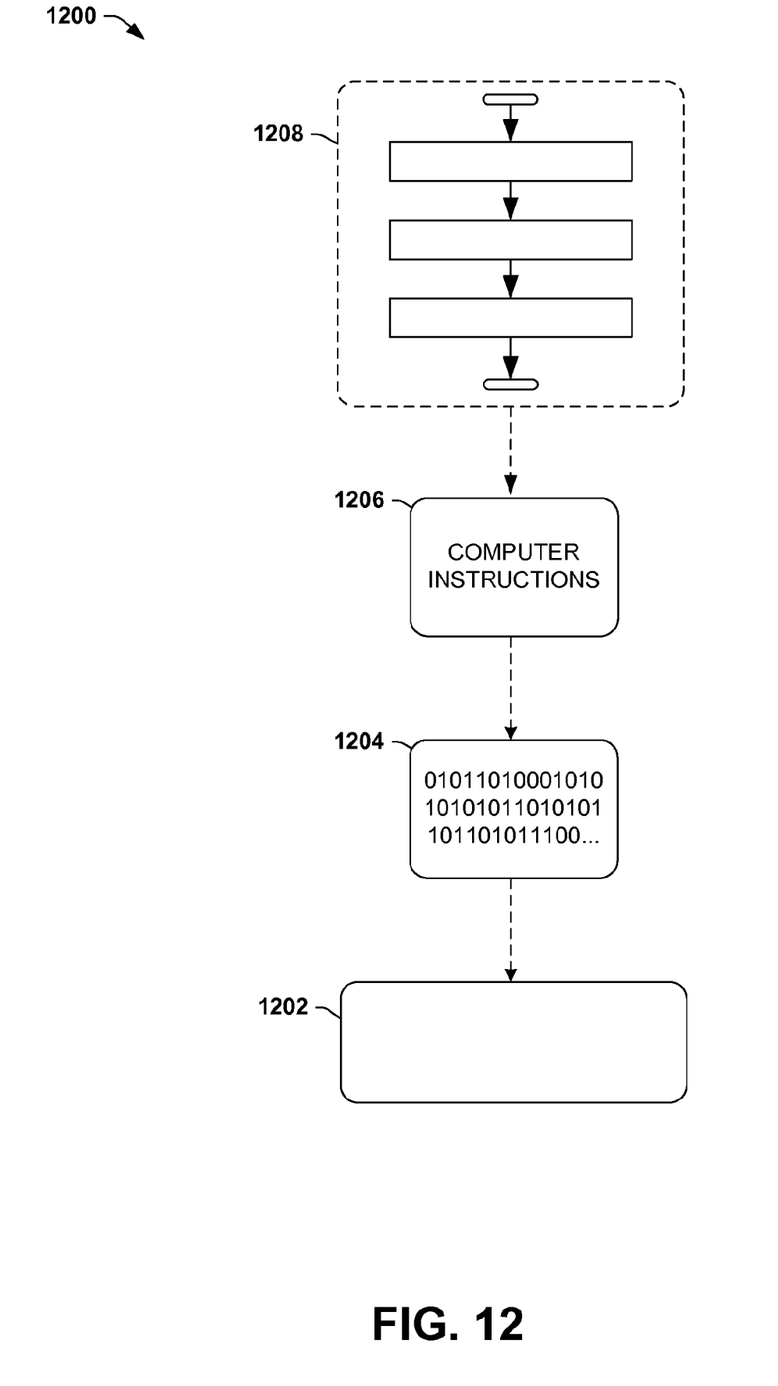
FIG. 12 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 12, wherein the implementation 1200 comprises a computer-readable medium 1202 (e.g., flash drive, a CD-R, DVD-R, or a platter of a hard disk drive), on which is encoded computer-readable data 1204. This computer-readable data 1204 in turn comprises a set of computer instructions 1206 configured to operate according to one or more of the principles set forth herein. In one such embodiment 1200, the processor-executable instructions 1206 may be configured to perform a method 1208, such as the example method 400 of FIG. 4 and/or 500 in FIG. 5, for example. In another such embodiment, the processor-executable instructions 1206 may be configured to implement a system, such as at least some of the exemplary system 100 of FIG. 1, for example. Many such computer-readable media may be devised by those of ordinary skill in the art that are configured to operate in accordance with one or more of the techniques presented herein.

It will be appreciated that there are numerous benefits to the systems and/or techniques described herein. For example, the disclosed techniques are designed to identify and/or classify objects that are generally difficult to identify and/or classify, such as granular objects (e.g., pills, candies, etc.) which typically have a higher false alarm rate relative to other objects that are examined by a radiography examination apparatus in a security setting, for example. Particularly, the systems and/or techniques described herein utilize unique properties of such objects, such as a radially symmetric Fourier transform, to identify and/or classify the objects. Moreover, the systems and/or techniques described herein provide for identifying and/or classifying an object based upon Fourier descriptors in a one-dimension spectral signature representative of the object under examination.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for identifying an object in image data generated by an examination using radiation, comprising:
   identifying, within three-dimensional image data, a region of interest (ROI) of the three-dimensional image data comprising a possible granular object based upon one or more morphological characteristics of the possible granular object;
   generating a set of one or more two-dimensional image slices of the region of interest from the three-dimensional image data;
   transforming the set of one or more two-dimensional image slices from an image domain to a spectral domain;
   generating one-dimensional spectral signature from the set of one or more two-dimensional image slices transformed into the spectral domain; and
   verifying, using the one-dimensional spectral signature, that the possible granular object is a granular object of the method implemented at least in part via a processing unit;
   wherein the one or more morphological characteristics correspond to an Eigen-box fill ratio (EBFR).

2. The method of claim 1, the ROI comprising a subset of voxels representing the possible granular object.

3. The method of claim 1, wherein the set of one or more two-dimensional image slices is selected such that a statistical measurement of values of voxels within respective slices of the one or more image slices is within one or more predefined limits.

4. The method of claim 1, wherein the set of one or more two-dimensional image slices is selected such that locations of respective slices of the one or more slices, as determined from a center of the object, is within one or more predefined limits.

5. The method of claim 1, the transforming comprising applying a Fourier transform to the set of one or more two-dimensional images to yield image data in a Fourier domain, where respective voxels of the image data in the Fourier domain is indicative of a complex value.

6. The method of claim 5, comprising computing a magnitude of the image data in the Fourier domain using complex values of respective voxels of the image data in the Fourier domain.

7. The method of claim 6, where image data indicative of a magnitude of the image data in the Fourier domain is yielded from the image data in the Fourier domain.

8. The method of claim 7, the generating comprising converting the image data indicative of the magnitude of the image data in the Fourier domain into the one-dimensional spectral signature representations.

9. The method of claim 1, the verifying comprising extracting features of the one-dimensional spectral signature.

10. The method of claim 9, wherein the extracted features comprise one or more of:
    a specified radial frequency;
    a ratio between magnitude values of specified radial frequencies;
    one or more statistical function values in a specified frequency band; or
    similarity of computed radial functions to radial functions associated with one or more known objects.

11. The method of claim 8, the generating comprising measuring a symmetry of the magnitude of the image data in the Fourier domain, the one-dimensional spectral signature indicative of a measured symmetry.

12. The method of claim 7, the one-dimensional spectral signature representative of the image data indicative of the magnitude of the image data in the Fourier domain, where a first variable of the one-dimensional spectral signature corresponds to a radial frequency dimension of the magnitude of the image data in the Fourier domain and a second variable of the one-dimensional spectral signature corresponds to a statistical measurement of voxels of the image data in the Fourier domain located along a circle with a corresponding radius in the image data indicative of the magnitude of the image data in the Fourier domain.

13. The method of claim 1, the verifying comprising classifying the object based upon an object score, where the object score is computed using features extracted from the one-dimensional spectral signature.

14. The method of claim 13, wherein the object score is computed by comparing the features extracted from the one-dimensional spectral signature to features of known granular objects, where the object score comprises a likelihood that the object is a granular object.

15. A system for identifying an object in image data generated by an examination using radiation, comprising:
    an image extractor configured to generate a set of one or more two-dimensional image slices of a region of three-dimensional image data comprising a possible granular object based upon one or more morphological characteristics;
    a transformer component configured to transform the set of one or more two-dimensional image slices from an image domain to a spectral domain;
    a spectral signature determination component configured to generate one or more signature curves for the object by converting the set of one or more two-dimensional image slices transformed into the spectral domain to a one-dimensional representation; and
    a comparison component configured to compare feature data of the one or more signature curves for the object against feature data for known objects to determine a probability that the object is associated with a particular class of objects, the image extractor the transformer component, the spectral signature determination component, and the comparison component implemented at least in part via a processing unit;
    wherein the one or more morphological characteristics correspond to an Eigen-box fill ratio (EBFR).

16. The system of claim 15, where the transformer component is configured to apply a Fourier transform to the set of one or more two-dimensional image slices to yield image data in a Fourier domain, where respective voxels comprised in the image data in the Fourier domain are respectively indicative of a complex value.

17. The system of claim 16, comprising a magnitude determiner component configured to compute a magnitude of respective voxels in the image data in the Fourier domain using complex values of the respective voxels to yield image data indicative of a magnitude of the image data in the Fourier domain, the spectral signature determination component configured to convert the image data indicative of the magnitude of the image data in the Fourier domain to generate the one or more signature curves.

18. The system of claim 17, comprising:

a feature extraction component configured to extract features of the one or more signature curves from the image data indicative of the magnitude of the image data in the Fourier domain, and where the comparison component is configured to classify the object by comparing the extracted features to features of one or more known objects.

19. A method for identifying objects in image data generated by an examination using radiation, comprising:

identifying, within three-dimensional image data, a region of interest (ROI) of the three-dimensional image data comprising a possible granular object based upon one or more morphological characteristics of the possible granular object;

generating a set of one or more two-dimensional image slices of the region of interest from the three-dimensional image data;

transforming the set of one or more two-dimensional image slices from an image domain to a spectral domain;

generating one or more one-dimensional spectral curves from the set of one or more two-dimensional image slices in the spectral domain, where a first variable of the one or more one-dimensional spectral curves comprises a radial frequency dimension of a spectral transform used during the transforming and a second variable of the one-dimensional one or more spectral curves comprises an average spectral transform value for spatial frequencies along a circle with a corresponding radius; and comparing feature data of the one or more one-dimensional spectral curves for the object against one or more thresholds to classify the object, the method implemented at least in part via a processing unit;

wherein the one or more morphological characteristics correspond to an Eigen-box fill ratio (EBFR).

* * * * *